(12) United States Patent
Koral et al.

(10) Patent No.: US 10,834,106 B2
(45) Date of Patent: Nov. 10, 2020

(54) NETWORK SECURITY EVENT DETECTION VIA NORMALIZED DISTANCE BASED CLUSTERING

(71) Applicant: AT&T Intellectual Property I, L.P., Atlanta, GA (US)

(72) Inventors: Yaron Koral, Cherry Hill, NJ (US); Rensheng Wang Zhang, Holmdel, NJ (US); Eric Noel, Holmdel, NJ (US); Patrick Velardo, Jr., Manalapan, NJ (US); Swapna Buccapatnam Tirumala, Holmdel, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 259 days.

(21) Appl. No.: 16/150,731

(22) Filed: Oct. 3, 2018

(65) Prior Publication Data

US 2020/0112571 A1    Apr. 9, 2020

(51) Int. Cl.
*H04L 29/06* (2006.01)
*G06N 3/08* (2006.01)
(Continued)

(52) U.S. Cl.
CPC ........ *H04L 63/1416* (2013.01); *G06K 9/6215* (2013.01); *G06K 9/6218* (2013.01);
(Continued)

(58) Field of Classification Search
CPC ............. H04L 63/1048; H04L 63/1416; H04L 63/1425
See application file for complete search history.

(56) References Cited

U.S. PATENT DOCUMENTS 5,835,901 A    11/1998   Duvoisin, III et al.
7,260,846 B2   8/2007    Day
(Continued)

FOREIGN PATENT DOCUMENTS

EP         0574937 B1    8/2000

OTHER PUBLICATIONS

Barford, Paul, and David Plonka. "Characteristics of network traffic flow anomalies." Proceedings of the 1st ACM SIGCOMM Workshop on Internet Measurement. ACM, 2001. http://dl.packetstormsecurity.net/papers/IDS/nids/Characteristics-of-Network-Flow-Anomalies.pdf.
(Continued)

*Primary Examiner* — Dao Q Ho

(57) ABSTRACT

A method may include a processing system assigning samples of network traffic data to positions in a list, where each of the samples is assigned a cluster identifier corresponding to the respective position, and traversing the list, where for each position, the processing system: increments an order indicator, and when the cluster identifier is not less than the order indicator, computes a distance between a sample assigned to the position and other samples, records a cluster identifier of another sample when a distance between the sample and the other sample is less than a threshold distance, and assigns a minimum cluster identifier that is recorded to all of the samples with cluster identifiers that are recorded. The processing system may determine clusters from cluster identifiers in the list after the traversing and identify at least one cluster as representing anomalous network traffic data.

20 Claims, 7 Drawing Sheets

(51) Int. Cl.
*G06K 9/62* (2006.01)
*H04L 12/26* (2006.01)

(52) U.S. Cl.
CPC ............ *G06N 3/08* (2013.01); *H04L 43/045* (2013.01); *H04L 63/1408* (2013.01); *H04L 63/1425* (2013.01)

(56) References Cited

U.S. PATENT DOCUMENTS

| | | | |
|---|---|---|---|
| 7,519,860 | B2 | 4/2009 | Hatonen et al. |
| 8,028,337 | B1 * | 9/2011 | Xu .......................... H04L 63/00 726/23 |
| 8,135,657 | B2 | 3/2012 | Kapoor et al. |
| 8,676,729 | B1 | 3/2014 | Keralapura et al. |
| 8,892,484 | B2 | 11/2014 | Sipple |
| 9,367,799 | B2 | 6/2016 | Hall et al. |
| 9,379,951 | B2 | 6/2016 | Mihnev |
| 9,386,028 | B2 * | 7/2016 | Altman ................. G06F 21/554 |
| 9,413,858 | B2 | 8/2016 | Leung et al. |
| 9,762,611 | B2 | 9/2017 | Wallace et al. |
| 9,847,924 | B2 * | 12/2017 | Angelov ............. H04L 63/1441 |
| 9,940,577 | B2 | 4/2018 | Jin et al. |
| 9,998,484 | B1 | 6/2018 | Buyukkayhan et al. |
| 2004/0117226 | A1 | 6/2004 | Laiho et al. |
| 2005/0060295 | A1 | 3/2005 | Gould et al. |
| 2016/0055190 | A1 | 2/2016 | Bar-Yam |
| 2017/0134401 | A1 | 5/2017 | Medvedovsky et al. |
| 2017/0161606 | A1 | 6/2017 | Duan et al. |
| 2018/0004948 | A1 | 1/2018 | Martin et al. |
| 2018/0041536 | A1 | 2/2018 | Berlin |
| 2018/0174001 | A1 | 6/2018 | Kang |
| 2018/0189325 | A1 | 7/2018 | Hohwald et al. |

OTHER PUBLICATIONS

Eltoft, TorbjØm. "A new neural network for cluster-detection-and-labeling." IEEE Transactions on neural networks 9.5 (1998): 1021-1035. http://booksc.org/dl/35554120/c8dc7d.

Bortolan, G., R. Degani, and J. L. Willems. "ECG classification with neural networks and cluster analysis." Computers in Cardiology 1991, Proceedings IEEE, 1991. https://www.researchgate.net/profile/Giovanni_Bortolan/publication/3510711_ECG_classification_with_neural_networks_and_cluster_analysis/links/559e552d0.

* cited by examiner

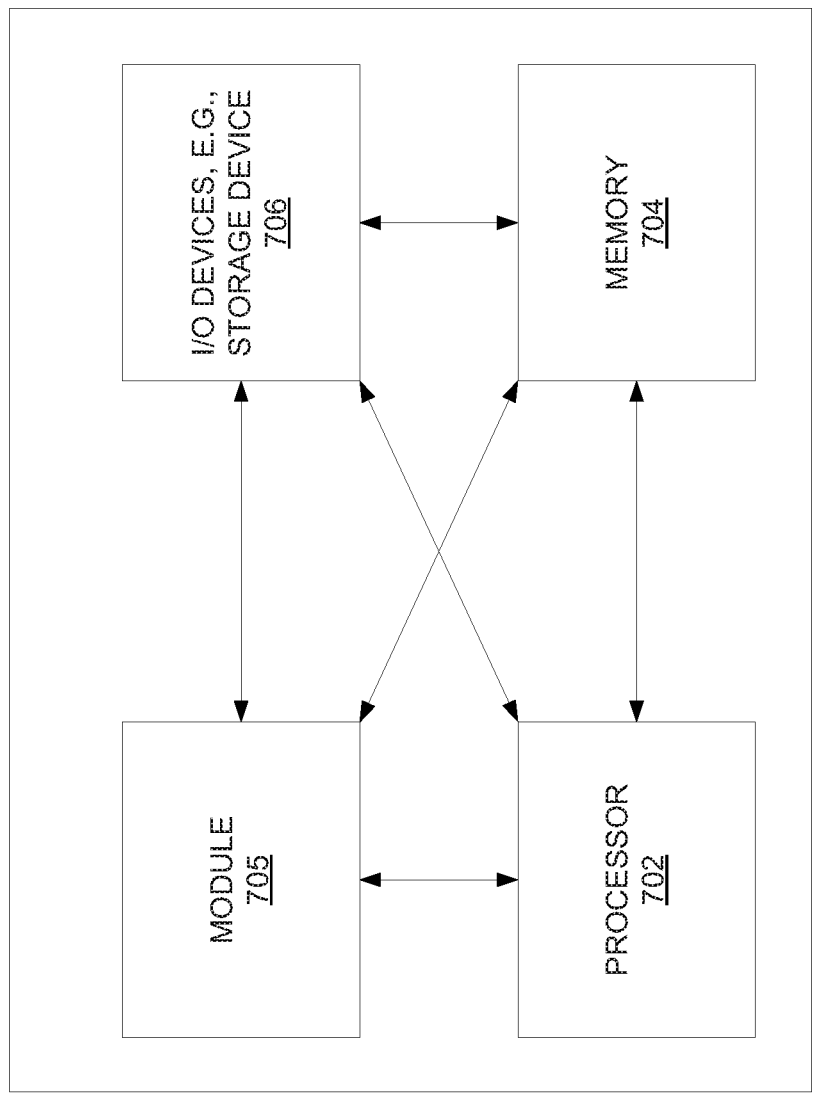

NETWORK SECURITY EVENT DETECTION VIA NORMALIZED DISTANCE BASED CLUSTERING

The present disclosure relates generally to identifying network security events, and more particularly to methods, computer-readable media, and devices for detecting anomalous domain name system traffic records via an encoder-decoder neural network, and methods, computer-readable media, and devices for identifying anomalous network traffic data via normalized distance-based clustering.

BACKGROUND

Internet traffic is extremely heterogeneous and thus defining what is "normal" is a challenging task. In addition, compared with the total volume of Internet traffic, an attack or other types of anomalous traffic may be considered as a rare event and may also have a unique pattern. Thus, bad actors may find it easy to blend within the overall Internet traffic undetected and perform malicious acts. For instance, as attack patterns evolve over time, conventional fixed signatures for attack detection may be easily circumvented, and network operators or other interested parties may be unaware of new types of attacks. With a volumetric based approach, numerous measurements and features may be collected to investigate anomalous traffic patterns. However, conventional detection and classification may involve overfitting with irrelevant or redundant features from the dataset, and may result in an excess number of false alarms. Moreover, attempts to describe anomalous behavior in terms that are understood by human beings often fail as the number of features that characterize a phenomenon may be much higher than what can be perceived. For this reason, anomalous behavior description may be reduced to few parameters, which in turn may cause mitigation efforts to either block benign traffic or to permit malicious traffic.

SUMMARY

In one example, the present disclosure describes a method, computer-readable medium, and device for detecting anomalous domain name system traffic records via an encoder-decoder neural network. For instance, in one example, a method may include a processing system having at least one processor obtaining a first plurality of domain name system traffic records, generating an input aggregate vector from the first plurality of domain name system traffic records, where the input aggregate vector comprises a plurality of features derived from the first plurality of domain name system traffic records, and applying an encoder-decoder neural network to the input aggregate vector to generate a reconstructed vector, where the encoder-decoder neural network is trained with a plurality of aggregate vectors generated from a second plurality of domain name system traffic records. In one example, the processing system may then calculate a distance between the input aggregate vector and the reconstructed vector, and apply at least one remedial action associated with the first plurality of domain name system traffic records when the distance is greater than a threshold distance.

In another example, the present disclosure describes a method, computer-readable medium, and device for identifying anomalous network traffic data via normalized distance-based clustering. For instance, in one example, a method may include a processing system having at least one processor assigning each of a plurality of samples of network traffic data to a respective position in a list, where each of the plurality of samples is assigned one of a plurality of cluster identifiers corresponding to the respective position in the list. In one example, the processing system then traverses the list, where for each position in the list, the processing system: increments an order indicator, determines if a cluster identifier for a sample assigned to the position is less than the order indicator, and shifts to a next position in the list when the cluster identifier is less than the order indicator. When the cluster identifier is not less than the order indicator, the processing system: computes a distance between the sample assigned to the position and all other samples in the plurality of samples, records a cluster identifier of the another one of the plurality of samples when a distance between the sample assigned to the position and another one of the plurality of samples is less than a threshold distance, the threshold distance based upon an aggregate normalized distance associated with a feature space of the plurality of samples and a number of the plurality of samples, and selects a minimum cluster identifier among the cluster identifiers that are recorded, for assignment to all other cluster identifiers that are recorded. In one example, the processing system may then determine a plurality of clusters of the plurality of samples from cluster identifiers remaining in the list after the traversing, and identify at least one of the plurality of clusters as representing anomalous network traffic data.

BRIEF DESCRIPTION OF THE DRAWINGS

The teachings of the present disclosure can be readily understood by considering the following detailed description in conjunction with the accompanying drawings, in which:

FIG. 7 illustrates a high level block diagram of a computing device specifically programmed to perform the steps, functions, blocks and/or operations described herein.

To facilitate understanding, identical reference numerals have been used, where possible, to designate identical elements that are common to the figures.

DETAILED DESCRIPTION

Figure 1:
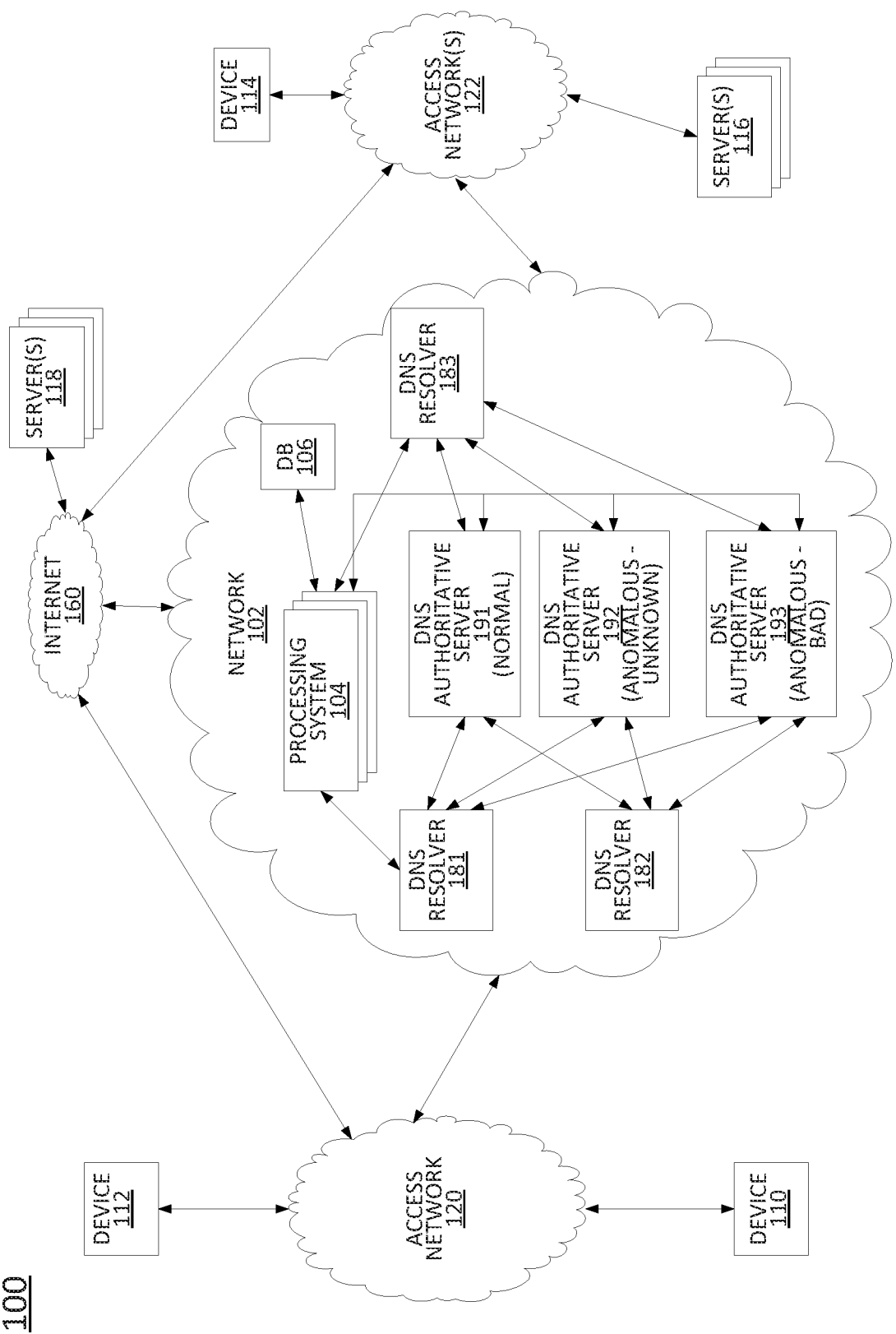
FIG. 1 illustrates an example network related to the present disclosure.

The Domain Name System (DNS) is one of the core building blocks of modern Internet infrastructure. For this reason it has become a main target of distributed denial of service (DDoS) attacks and other malicious activities. For a given website, a record associating its uniform resource locator (URL) with one or more Internet Protocol (IP)

addresses is maintained at a specific DNS authoritative server. Denying access to this DNS authoritative server may prevent clients from accessing the website. Attackers are using techniques such as overloading a DNS authoritative server with resolving requests in order to cause the DNS authoritative server to eventually crash. However, attackers are not accessing the DNS authoritative server directly. Rather, attackers are relying upon other servers, specifically DNS resolvers, to send the actual requests to the DNS authoritative servers, which may make it hard to distinguish between "good" and "bad" traffic. Many mitigation techniques that aim at blocking malicious traffic often end up blocking benign traffic as well.

In one example, the present disclosure applies a two stage multi-class security event detection and classification method to identify anomalous network traffic. More specifically, in one example, the present disclosure includes an unsupervised encoder-decoder neural network learning approach, which assumes no prior knowledge of the nature of the analyzed network traffic. Initially, examples of the present disclosure may build an encoder-decoder neural network (e.g., an autoencoder) that learns the characteristics of "normal" network traffic from a plurality of input vectors. For instance, in an example relating to DNS traffic, and more specifically to traffic associated with DNS authoritative servers, the encoder-decoder neural network may be trained with "input aggregate vectors," which in one example may comprise one minute aggregate records per source IP address (e.g., per DNS resolver). Unlike principal component analysis (PCA), which is typically a linear transform, a neural network structure can implement nonlinear transforms to capture more complicated traffic patterns. It should be noted that in one example, instead of utilizing the original network traffic data for anomalous traffic classification, input aggregate vectors (e.g., aggregate features sets) are utilized to enhance the detection accuracy and reduce the computational complexity.

In one example, an encoder-decoder neural network of the present disclosure generates two sets of results. One is a reconstruction error for each input vector, which may be used to identify anomalous network traffic records. For instance, the reconstruction error may comprise the difference (e.g., a Euclidean distance) between the input vector and a reconstructed vector that is output from the encoder-decoder neural network. In accordance with the present disclosure, when the reconstruction error exceeds a threshold, the encoder-decoder neural network does not accurately capture the network traffic data, and thus the network traffic data is considered to be anomalous. In one example, sources (e.g., IP addresses) associated with the anomalous network traffic data may be identified and flagged for remedial action. In one example, the sources may include DNS resolvers initiating requests to one or more authoritative DNS servers. In one example, the sources may alternatively or additionally include one or more clients directing DNS queries to DNS resolvers.

The other output of the encoder-decoder neural network is a feature vector with reduced dimensions (broadly, a "compressed vector representation"), which may also be utilized for anomalous network traffic detection, and which may further be utilized to classify particular types of anomalous network traffic. For instance, in one example, compressed vector representations associated with anomalous network traffic are clustered and may further be labeled based on anomaly type. A first cluster may represent "normal" network traffic, while one or more additional clusters may each represent a type of attack or other malicious and/or anomalous activities. Thereafter, compressed vector representations of input vectors for subsequent network traffic data that fall within a cluster may further be identified as a particular type of anomaly. In addition, sources (e.g., IP addresses) that may be involved in or otherwise associated with the identified anomalous network traffic data may be identified and flagged for remedial action. In one example, the remedial action may further be tailored to the particular type of anomaly.

In one example, network traffic records are aggregated (e.g., by one minute time intervals, or another time interval, by DNS resolver or by some other criteria, etc.). Notably, tens of billions of daily records may be scaled-down to several million input aggregate vectors, which may be efficiently processed via an encoder-decoder neural network as described herein. The encoder-decoder neural network may further implement non-linear transforms to reduce feature dimensions to facilitate the anomaly classification. Examples of the present disclosure are thus computationally efficient, and may be deployed for anomalous network traffic detection in real-time or near real-time. In addition, although examples of the present disclosure are described herein primarily in connection with DNS traffic records, in other, further, and different examples, the present disclosure may equally apply to network security event detection regarding other types of network traffic, such as: transmission control protocol (TCP) SYN/ACK messaging, software defined network (SDN) control messaging (e.g., NETCONF messaging, YANG messaging, or the like), server connection request messages at one or more servers of one or more domains, border gateway protocol (BGP) update messages, content retrieval from a content distribution network (CDN), and so forth.

In one example, the compressed vector representation generated via the encoder-decoder neural network includes a different set of features from the input vector, which may have no apparent meaning to a human observer. Many applications of encoder-decoder neural networks involve image compression, where the encoder portion of the encoder-decoder neural network is utilized to generate a compressed image version, e.g., for transmission over a network, for storage, etc., and the decoder portion is utilized to recreate the image at the destination, after retrieval from storage, etc. Thus, the compressed vector representation is simply a format from which the original input vector (or a good approximation thereof) can be recreated. Some applications also use encoder-decoder neural networks for noise reduction, image smoothing, and other tasks. In all of these cases, the compressed vector representation is purely intermediate data and is of value only for the reconstruction of the original input vector or an approximation thereof.

One common task for machine learning (ML) in cybersecurity is to identify the observable features of anomalies for root-cause analysis and solution recommendation. However, cyber-attacks are often hidden in a multitude of regular harmless traffic. In other words, the malicious traffic volume is extremely small compared to normal traffic. In addition, most existing clustering methods work well only for even cluster sizes. Hence existing clustering algorithms applied to general Internet traffic records may fail to generate and/or to identify clusters which represent malicious traffic. Furthermore, existing clustering approaches may require upfront knowledge of the total number of clusters, which may be unavailable.

In contrast, examples of the present disclosure utilize the compressed vector representation for clustering and anomalous network traffic identification. In one example, the compressed vector representations of input vectors (e.g., "input aggregate vectors") are clustered such that each cluster may identify a different anomaly related to the domain problem. The present clustering technique can be efficiently applied to high-dimensional spaces, is insensitive to highly uneven cluster sizes, and does not require prior knowledge of a total number of clusters.

The present clustering technique includes a multi-dimensional distance calculation which is efficient over large volumes of data and which scans and merges samples (e.g., compressed vector representations of network traffic data) into clusters. In one example, the present disclosure first calculates a normalized distance as a clustering criterion. In accordance with the present disclosure, a normalized distance for a single dimension (e.g., an individual feature type/field of the compressed vector representation) assumes there is a maximum value and a minimum value for features of such a feature type. The normalized distance for the dimension is then defined as the difference between the maximum value and the minimum value divided by one less than the number of samples (e.g., the number of compressed vector representations to be clustered). In other words, if the samples were evenly distributed along the single dimension, each would be separated from the next by the normalized distance. For a multi-dimensional feature space, the aggregate normalized distance is a Euclidean distance defined as the product of normalized distances for each of the component dimensions divided by one less than the number of samples.

With the aggregate normalized distance being calculated, the clustering process may then include assigning each sample to an individual cluster. In one example, for each sample/cluster, other samples/clusters within a threshold distance are identified. The threshold distance may be based upon the aggregate normalized distance, e.g., 1.5 times the normalized distance, 2 times the normalized distance, 8 times the normalized distance, etc. Nearby clusters (i.e., samples and/or clusters of multiple samples that are within the threshold distance/scaled normalized distance) are then merged. In one example, the scaling factor over the aggregate normalized distance is used to control how dense or how loose the clustering should be. The clustering ends when no more clusters can be merged according to the above criteria. Any outliers will stay as outlier clusters and have no impact on other clusters.

In one example, the largest cluster may be automatically labeled as being associated with "normal" network traffic data. One or more other clusters may then be identified as anomalous network traffic data. In one example, the other clusters may also be labeled, e.g., by a network technician, by a subject matter expert, etc. In one example, the other clusters may be labeled automatically. For instance, compressed vector representations that are the samples for clustering may be known to represent input vectors relating the network traffic data from particular sources to particular destinations, etc. To illustrate, a network intelligence database may be maintained wherein certain sources (e.g., IP addresses) have been identified as being associated with particular types of anomalous traffic, such as known botnet command and control servers, known sources of scan and probe attacks, known DNS authoritative server DDoS attack sources, and so forth. For instance, different network operators may share data of this nature such that when a given network detects anomalous traffic from a particular bad actor, or group of bad actors for the first time, the anomalous traffic may be detected via the techniques described herein and grouped into one or more clusters. The unknown clusters may then be labeled in accordance with the known identities and activities of these sources as derived from the network intelligence database.

In addition, when clusters associated with anomalous network traffic data are labeled, the network may then apply remedial actions which are specific to certain types of attacks or other anomalous traffic. For instance, for anomalous network traffic data comprising a DDoS on a DNS authoritative server, sources originating DNS requests associated with the cluster may then be blocked, redirected to a different DNS authoritative server designated to handle requests from bad actors, and so forth. These and other aspects of the present disclosure are described in greater detail below in connection with the examples of FIGS. 1-7.

To further aid in understanding the present disclosure, FIG. 1 illustrates an example system 100 in which examples of the present disclosure for detecting anomalous domain name system traffic records via an encoder-decoder neural network and for identifying anomalous network traffic data via normalized distance-based clustering may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102. The network 102 may be in communication with one or more access networks 120 and 122, and Internet 160. In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth. As further illustrated in FIG. 1, network 102 may include a plurality of DNS resolvers 181-183, a plurality of DNS authoritative servers 191-193, and a processing system 104. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of network 102 may provide a cable television service, an IPTV service, or any other type of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access networks 120 may be in communication with one or more devices 110 and 112. Similarly, access networks 122 may be in communication with one or more devices, e.g., device 114. Access networks 120 and 122 may transmit and receive communications between devices 110, 112, and 114, between devices 110, 112, and 114, and servers 116, servers 118, DNS resolvers 181-183, other components of network 102, devices reachable via the Internet in general, and so forth. In one example, each of devices 110, 112, and 114 may comprise any single device or combination of devices that may comprise a user endpoint device. For example, the devices 110, 112, and 114 may each comprise a mobile device, a cellular smart phone, a laptop, a tablet computer, a desktop computer, an application server, a bank or cluster of such devices, and the like. In one example, any of devices 110, 112, and 114 may comprise sensor devices with wireless networking hardware, e.g., Internet of Things (IoT) devices, for gathering measurements of an environment, uploading the measurements to one or more servers or other devices, and so forth.

In one example, the access network 122 may also be in communication with one or more servers 116. Similarly, one or more servers 118 may be accessible to devices 110, 112, and 114, to servers 116, and so forth via Internet 160 in general. Each of the one or more servers 116 and one or more servers 118 may be associated with one or more IP addresses to enable communications with other devices via one or more networks. Each of the server(s) 116 and server(s) 118 may be associated with, for example, a merchant, a service business, a news source, a weather source, a school, a college or university, or other educational content providers, a social media site, a content distribution network, a cloud storage provider, a cloud computing application host, and so forth.

In accordance with the present disclosure, each of server(s) 116 and server(s) 118 may comprise a computing system or server, such as computing system 700 depicted in FIG. 7, and may be configured to provide one or more operations or functions in connection with examples of the present disclosure for detecting anomalous domain name system traffic records via an encoder-decoder neural network and/or for identifying anomalous network traffic data via normalized distance-based clustering, as described herein. For instance, although examples of the present disclosure are described primarily in connection with DNS traffic records, in other, further, and different examples, network traffic records may relate to other types of network traffic, such as: server connection request messages at one or more servers of one or more domains, e.g., transmission control protocol (TCP) SYN/ACK messaging, Uniform Datagram Protocol (UDP) messaging, IP packets for streaming video, streaming audio, or general Internet traffic, and so forth. Accordingly, in one example, network traffic data may be gathered and/or provided by server(s) 116 and/or server(s) 118. For instance, server(s) 116 and/or server(s) 118 may maintain server logs and may provide the servers logs or log summaries periodically or by request, may transmit exception messages or error messages, and so forth (e.g., to processing system 104).

In accordance with the present disclosure, processing system 104 may comprise one or more physical devices, e.g., one or more computing systems or servers, such as computing system 700 depicted in FIG. 7, and may be configured to provide one or more operations for detecting anomalous domain name system traffic records via an encoder-decoder neural network and/or for identifying anomalous network traffic data via normalized distance-based clustering, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 7 and discussed below) or multiple computing devices collectively configured to perform various steps, functions, and/or operations in accordance with the present disclosure.

In one example, database (DB) 106 may comprise a physical storage device integrated with processing system 104 (e.g., a database server), or attached or coupled to the processing system 104, to store various types of information in support of systems for detecting anomalous domain name system traffic records via an encoder-decoder neural network and/or for identifying anomalous network traffic data via normalized distance-based clustering, in accordance with the present disclosure. For example, DB 106 may store network traffic data, or other records from which network traffic data may be derived, may store reputation scores or values for various sources, such as devices 110, 112, 114, DNS resolvers 181-183, and so forth, may store encoder-decoder neural network instruction set(s), training data, testing data, and so forth for detecting anomalous network traffic data records (e.g., anomalous DNS traffic records), may store instruction set(s) and related data records for normalized distance-based clustering, in accordance with the present disclosure, and so on. In one example, processing system 104 may load instructions into a memory, or one or more distributed memory units, and execute the instructions for detecting anomalous domain name system traffic records via an encoder-decoder neural network and/or for identifying anomalous network traffic data via normalized distance-based clustering, as described herein. Example methods for detecting anomalous domain name system traffic records via an encoder-decoder neural network and for identifying anomalous network traffic data via normalized distance-based clustering are described in greater detail below in connection with FIGS. 5 and 6.

In one example, processing system 104, DNS resolvers 181-183, and/or DNS authoritative servers 191-193 may operate in a distributed and/or coordinated manner to perform various steps, functions, and/or operations described herein. To illustrate, processing system 104 may obtain DNS traffic records (e.g., from DNS authoritative servers 191-193 and/or from DNS resolvers 181-183, from DB 106, etc.), generate aggregate vectors comprising a plurality of features from the DNS traffic records, e.g., one minute records per DNS resolver, and train an encoder-decoder neural network with the aggregate vectors, e.g., to identify "normal" aggregate vectors (which represent "normal" DNS traffic records). The DNS traffic records may relate to DNS queries from devices 110, 112, and/or 114, or server(s) 116 to any one or more of DNS resolvers 181-183, may relate to DNS queries forwarded by DNS resolvers 181-183 to any one or more of DNS authoritative servers 191-193, and so forth. For instance, device 112 may select and/or be assigned DNS resolver 181, device 110 may select and/or be assigned DNS resolver 182, device 114 and server(s) 116 may be assigned DNS resolver 183, and so forth.

In an illustrative example, device 110 may seek to obtain access to a webpage for a banking service, which may be hosted on one of the servers 118, but which may be unknown to the device 110 and/or a user of the device 110. To access the webpage, a DNS query from device 110 may comprise, for example, the domain name "examplebank.com" and may be submitted to DNS resolver 182. DNS resolver 182 may provide the current IP address for device 110 to access examplebank.com if there is an associated record in a cache at DNS resolver 182. For instance, DNS resolver 182 may maintain records for domains that have been recently queried (e.g., within the last 12 hours, the last 24 hours, etc.), may maintain records for certain designated domains (e.g., the most popular 10,000 and/or the 10,000 most queried domains over the last six months), and so forth. Otherwise, DNS resolver 182 may seek the IP address from one or more other DNS resolvers or from a DNS authoritative server.

It should be noted that DNS architectures may include multiple layers (e.g., hierarchical layers) of DNS resolvers with one or more DNS authoritative servers providing definitive records for domains respectively assigned to the different DNS authoritative servers. In one example, DNS resolvers 181-183 may follow a recursive process for obtaining an IP address for a submitted query, by accessing other DNS resolvers and/or DNS authoritative servers. However, for ease of illustration, FIG. 1 illustrates a single layer of DNS resolvers 181-183. Thus, if DNS resolver 182 does not have a record for examplebank.com, the DNS resolver 182 may then submit the query to one or more DNS authoritative servers (e.g., one or more of DNS authoritative servers 191-193). For instance, network 102 may be configured such that DNS resolver 182 may, by default, forward unresolved DNS queries to DNS authoritative server 191. Assuming DNS authoritative server 191 possesses the record for examplebank.com, the associated IP address may then be returned to DNS resolver 182 and on to device 110 by DNS resolver 182.

It should be noted that various techniques may be employed to provide load balancing among different servers for examplebank.com and other domains. For instance, DNS queries for examplebank.com that originate in a first geographic area, from a first set of IP subnet addresses, etc. may be directed to a first server accessible via a first IP address, while DNS queries for examplebank.com that originate in a different geographic area, a different set of IP subnet addresses, etc. may be directed to a second server accessible via a second IP address. Other examples may involve responding to DNS queries and redirecting to different IP addresses (which may identify different servers or other target devices) based upon time of day, current load at a main server, the type of requesting device, the capabilities of such a requesting device, and so forth. These types of differentiations may all be provided by different records maintained by DNS authoritative servers 191-193, and/or by DNS resolvers 181-183 (e.g., for those domains for which the DNS resolvers 181-183 may currently maintain records).

The foregoing describes just one example of a DNS query and response. Thus, it should be understood that DNS resolvers 181-183 and DNS authoritative servers 191-193 may process a large number of additional DNS queries from devices 110, 112, and 114, and from other clients on any given day, any given week, etc. DNS queries are for a variety of purposes including accessing webpages, loading advertisements or other third party content to webpages, directing IoT sensor devices to storage locations to upload sensor data, obtaining and verifying cryptographic certificates, retrieving segments of streaming media from different content servers of a content distribution network (CDN), and so forth.

Figure 2:
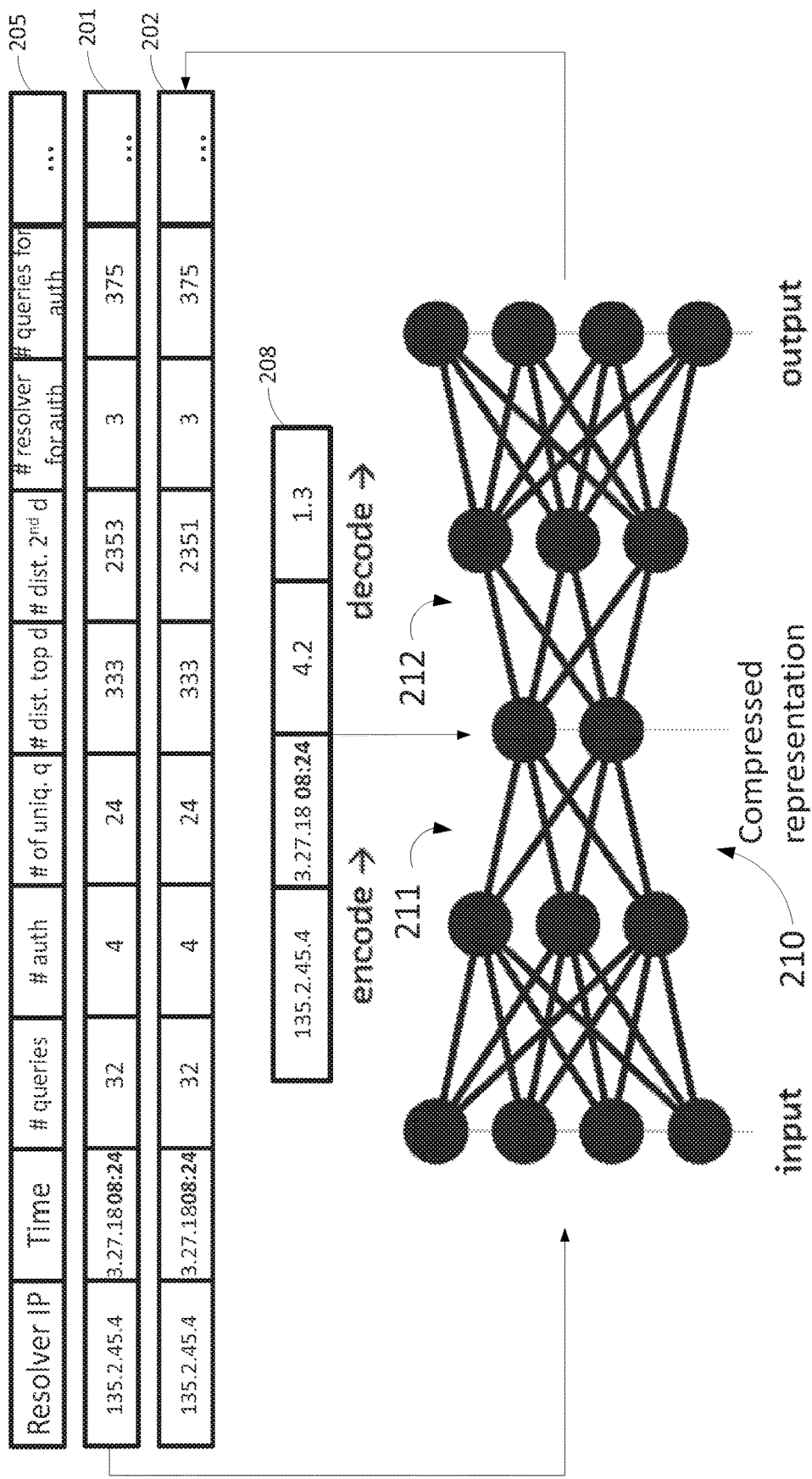
FIG. 2 illustrates an example encoder-decoder neural network process in accordance with the present disclosure.

All of this DNS traffic may generate a variety of DNS traffic records by DNS resolvers 181-183 and/or DNS authoritative servers 191-193. For instance, there may be tens of billions of DNS traffic records generated in network 102 each day. In one example, for scalability and efficiency, these DNS traffic records may be combined, summarized, averaged, and/or otherwise pre-processed to generate aggregate vectors. For instance, from over 20 billion daily DNS traffic records, several million aggregate vectors may be generated. In one example, each aggregate vector may be associated with one DNS resolver and may relate to DNS traffic records for a given time period, e.g., one minute of DNS traffic records, two minutes of DNS traffic records, etc. In addition, each aggregate vector may have a number of fields, e.g., 20 fields, 50 fields, 60 fields, 100 fields, etc. All of these aggregate vectors may be used to train the encoder-decoder neural network (e.g., to encode and decode "normal" aggregate vectors. An example aggregate vector is illustrated in FIG. 2 and described in greater detail below.

Once the encoder-decoder neural network is trained, the processing system 104 may then obtain additional DNS traffic records, generate input aggregate vectors, apply the encoder-decoder neural network to the input aggregate vectors, calculate distances between the input aggregate vectors and respective reconstructed vectors from the decoder portion of the encoder-decoder neural network, and determine whether the input aggregate vectors represent normal DNS traffic records or anomalous DNS traffic records depending upon the distance. For instance, the (Euclidean) distance may represent a "score," where for a lower score (closer distance), the encoder-decoder neural network may be considered to accurately model an input aggregate vector. For a higher score (farther distance), the encoder-decoder neural network may be considered to poorly model the input aggregate vector, thus identifying an anomalous input aggregate vector (and thus also identifying anomalous DNS traffic records from which the input aggregate vector is derived). The processing system 104 may apply a threshold, such as a scaled distance of 0.2 (scaled from 0 to 1) for which any distance greater than 0.2 may be considered to be associated with an anomaly, and any distance 0.2 or closer may be considered to be associated with normal traffic. It should be noted that in other examples, a different scaled distance threshold may be applied (e.g., 0.1, 0.25, 0.32, etc.), a non-scaled distance threshold may be applied, and so forth.

In one example, for anomalous DNS traffic records identified by processing system 104 (e.g., when the distance/score exceeds a threshold), the processing system 104 may apply one or more remedial actions such as blocking DNS traffic from one or more clients associated with the anomalous DNS traffic records, directing queries from DNS resolver(s) associated with anomalous DNS traffic records to a different DNS authoritative server, blocking, dropping, or redirecting additional types of traffic from the client(s) and/or DNS resolver(s) associated with anomalous DNS traffic records, and so forth. As just one example, DNS resolver 181 may be detected to be a source of anomalous DNS traffic records. For instance, device 112 may direct DNS queries to DNS resolver 181, or may have DNS queries directed to DNS resolver 181, and may be sending a large volume of queries and/or a large number of queries in fast succession, e.g., as part of malicious scanning activity.

The scanning activity may be an attempt to learn a domain structure for a large entity, such as a bank, including identifying valid sub-domains, the IP addresses associated with the sub-domains, and so forth. The DNS resolver 181 may be configured to send/forward DNS queries from clients to DNS authoritative server 191 (which may be the DNS authoritative server for the domain). Thus, the anomalous DNS traffic records (for the malicious scan activity) may comprise the DNS queries from DNS resolver 181 to DNS authoritative server 191 which may be detected via the encoder-decoder neural network as described. It should be noted that there may be additional DNS queries from DNS resolver 181 to DNS authoritative server 191 for non-malicious clients. However, due to the large volume of queries for the particular malicious client (device 112), the anomalous DNS traffic records may be apparent from the input aggregate vector(s) associated with DNS resolver 181.

In any event, when the anomalous DNS traffic records are identified as being associated with DNS resolver 181, in one example processing system 104 may instruct/reconfigure DNS resolver 181 to instead send DNS queries to DNS authoritative server 192, e.g., for anomalous DNS traffic records of an unknown type. For instance, at this point, the processing system 104 may identify that an anomaly is detected, but may not know if the anomaly is a scan activity or other types of malicious activity, or if the anomaly is benign but not representative of "normal" traffic. Alternatively, or in addition, processing system 104 may instruct/reconfigure DNS authoritative server 191 to drop or block DNS queries from DNS resolver 181, e.g., for a designated period of time or until otherwise instructed to re-permit DNS queries from DNS resolver 181. In another example, DNS authoritative server 192 may be configured to limit the rate of DNS requests that will be accepted. For example, any request that exceeds this rate will be dropped.

In one example, in addition to identifying anomalous DNS traffic records and implementing remedial actions as described above, the processing system 104 may further perform clustering operations to identify clusters of anomalous network traffic data (e.g., DNS traffic records), and to associate the clusters with particular types of malicious activity or other types of anomalies. In one example, the clustering may be in accordance with the examples described in connection with FIGS. 4 and 6, e.g., normalized distance-based clustering. In one example, the clustering may be applied to samples of network traffic data comprising compressed vector representations of input aggregate vectors generated via the encoder-decoder neural network. In one example, the encoder-decoder neural network encodes the input aggregate vectors (e.g., derived from DNS traffic records) as compressed vector representations and decodes the compressed vector representations as reconstructed vectors. For instance, the processing system 104 may be configured to generate compressed vector representations via the encoder-decoder neural network comprising two features, four features, seven features, etc., whereas the input aggregate vectors may have a much greater number of features, such as 50 features, 60 features, 100 features, etc.

In one example, the clusters may be plotted in a graph and provided to one or more entities associated with network 102, such as network technicians, subject matter experts, etc. For instance, the graph may comprise a plurality of dimensions related to the number of features of the compressed vector representation(s). In one example, the clusters may be labeled automatically by processing system 104. For instance, DB 106 may store compressed vector representations that may be known to represent input vectors relating to particular types of anomalies. Thus, the processing system 104 may associate certain clusters with certain types of anomalies. In another example, the clusters may be labeled by network technicians or others.

Once labeled, processing system 104 may then apply remedial actions which are specific to certain types of attacks or other anomalous traffic. For instance, the encoder-decoder neural network may be applied to an input aggregate vector for new network traffic data, the compressed vector representation may be generated and clustered, and then depending upon the cluster to which the compressed vector representation is assigned, the processing system 104 may implement a type of remedial action that is specific to the type of anomaly. For instance, if the cluster is labeled as a DDoS on a DNS authoritative server, sources originating DNS requests associated with the cluster may then be blocked, redirected to a different DNS authoritative server designated to handle requests from bad actors, and so forth. The identification of anomalous network traffic data (e.g., DNS traffic records) via the association of compressed vector representations with clusters of known anomaly types may be used as an alternative or in addition to the identification of anomalous network traffic data (e.g., anomalous DNS traffic records) through distance comparisons between input aggregate vectors and the reconstructed vectors output via the encoder-decoder neural network as described above.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet 160 may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. For example, device 114 and server(s) 116 may communicate with network 102 via different access networks, devices 110 and 112 may communicate with network 102 via different access networks, and so forth. Thus, these and other modifications are all contemplated within the scope of the present disclosure.

FIG. 2 illustrates an example encoder-decoder neural network process 200 in accordance with examples of the present disclosure for detecting anomalous domain name system traffic records via an encoder-decoder neural network and for identifying anomalous network traffic data via normalized distance-based clustering. As illustrated in FIG. 2, an encoder-decoder neural network 210 (e.g., an autoencoder) may include an encoder portion 211 and a decoder portion 212, which may be symmetric and may include a number of layers and a number of nodes in each layer. The encoder-decoder neural network 210 may take an input vector 201, encode the input vector 201 into a compressed vector representation 208, and decode the compressed vector representation 208 into a reconstructed vector 202. The input vector 201 may have a plurality of features, e.g., nine (9) features, 50 features, 60 features, 100 features, etc., which may be aggregated from DNS traffic records in a network. Example types of features are indicated in the feature key 205 and may include: a DNS resolver IP address for which the DNS traffic records are aggregated, a time block from which the DNS traffic records are aggregated, a number of queries (e.g., in thousands) processed by the DNS resolver in the time period, a number of DNS authoritative servers contacted by the DNS resolver in the time period, a number of unique clients submitted queries to the DNS resolver in the time period, a number of distinct top level domains queried in the time period, a number of distinct second level domains queried in the time period, a number of DNS resolvers serviced by the top DNS authoritative server contacted by the DNS resolver in the time period, and a number of queries submitted to the DNS authoritative server by the DNS resolver in the time period. The foregoing relates to DNS traffic records and represents just some of the example feature types that may be included in an aggregate vector in accordance with the present disclosure. For instance, other examples may include more or less features, different features, etc. In addition, other examples may relate to other types of network traffic and thus may include different feature types that are pertinent to such types of network traffic.

The encoder-decoder neural network 210 may be trained with a plurality of aggregate vectors of a similar nature to aggregate vector 201, where for each of the plurality of aggregate vectors, nodes in each respective layer of the encoder portion 211 and the decoder portion 212 are updated via a feedforward pass and a backpropagation of a deviation measure between the aggregate vector and a respective reconstructed vector that is generated via the decoder portion 212 (e.g., a distance/score between the input vector and the reconstructed vector). In one example, the backpropagation is to collectively minimize the deviation measures/reconstruction errors. For example, the plurality of aggregate vectors may comprise training data that is representative of "normal" network traffic data.

Once trained, the encoder-decoder neural network 210 may be applied to the input vector 201 to create the compressed vector representation 208, which may have just two features (excluding the DNS resolver IP address and the time information), having the values 4.2 and 1.3, respectively. It should be noted that these feature and values may have no apparent real-world meaning that is understandable to a network technician or other humans interpreting this information. Nevertheless, the compressed vector representation 208 may be used for clustering and identification of anomaly type(s) as described herein.

In addition, the compressed vector representation 208 may also be used to generate the reconstructed vector 202 via the decoder portion 212 of the encoder-decoder neural network 210. The reconstructed vector 202 has the same field types as input vector 201. When the encoder-decoder neural network 210 accurately models the input vector 201, the reconstructed vector 202 should be identical or close to the input vector 201. In such case, the distance between the input vector 201 and the reconstructed vector 202 should be zero or near zero. On the other hand, when the distance is greater, the encoder-decoder neural network 210 may be considered to poorly model the input vector 201, in which case the input vector 201 may be considered an anomaly.

Figure 3:
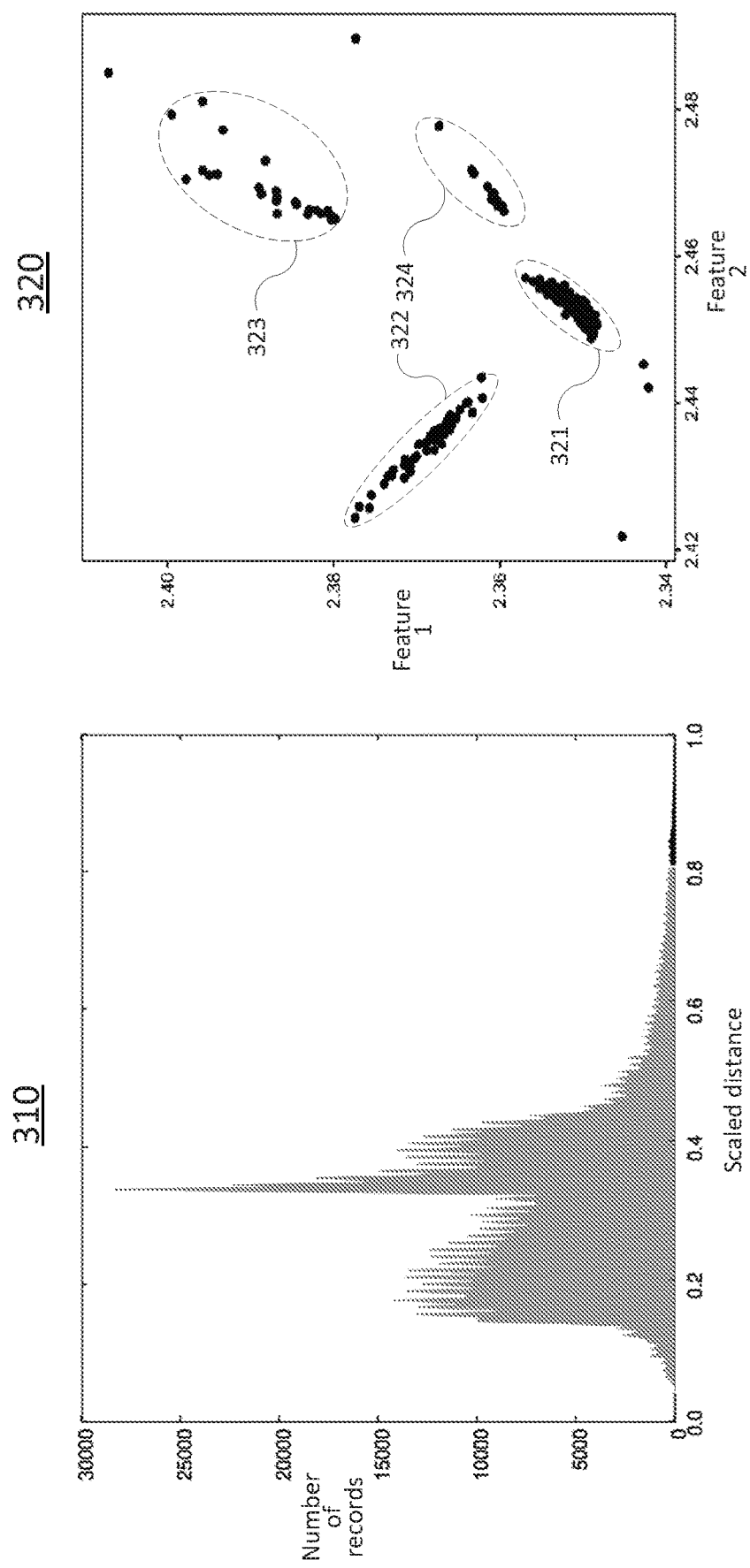
FIG. 3 illustrates an example graph of encoder-decoder neural network accuracy for input vectors derived from domain name system traffic records and an example graph of encoder-decoder neural network compressed vector representations of input vectors derived from domain name system traffic records.

FIG. 3 illustrates an example graph 310 of encoder-decoder neural network accuracy for input vectors derived from DNS traffic records and an example graph 320 of encoder-decoder neural network compressed vector representations of input vectors derived from DNS traffic records. In the graph 310, the vertical axis indicates a number of input vectors (number of records), and the horizontal axis indicates the scaled distance/score between each of the input vectors and a respective reconstructed vector generated via an encoder-decoder neural network (such as encoder-decoder neural network 210 of FIG. 2). In the present example, any distance/score greater than 0.8 may be considered to be an anomaly. As can be seen, the vast majority of input vectors (and hence the DNS traffic records or other network traffic data from which such input vectors are derived) are considered "normal," whereas the anomalies are rare events.

In the graph 320, the vertical axis may represent a first feature type and the horizontal axis may represent a second feature type of compressed vector representations generated via an encoder-decoder neural network. In the present example, the compressed vector representations may each comprise two features. For instance, the compressed vector representations may be of the same form as compressed vector representation 208 of FIG. 2 (with two features, exclusive of the DNS resolver IP and time fields). As can be seen in the graph 320, there are four clusters 321-324, with a few outliers (which may be considered as single element clusters). In the present example, the majority of compressed vector representations (e.g., greater than 99.9 percent, greater than 99.99 percent, etc.) may be grouped within cluster 321, which may represent "normal" network traffic records (e.g., normal DNS traffic records), whereas lesser numbers of compressed vector representations may fall within clusters 322-324, respectively. In one example, clusters 321-324 may be identified manually, e.g., by visual inspection. In another example, clusters 321-324 may be automatically identified via a clustering algorithm. For instance, clusters 321-324 may be automatically identified via the normalized distance-based clustering process of FIG. 4 and/or the example method 600 of FIG. 6.

Each of the different clusters 322-324 may represent a different type of anomaly. For instance, cluster 322 may represent a DDoS on a DNS authoritative server, cluster 323 may represent scanning and probing activity, and cluster 324 may represent traffic relating to DNS resolver cache poisoning. In one example, the largest cluster 321 may be automatically labeled as being associated with "normal"

network traffic data. The other clusters 322-324 may then be identified as representing anomalous network traffic data. In one example, the other clusters 322-324 may also be labeled as particular types of anomalies. For instance, compressed vector representations that are the samples for clustering may be known to represent input vectors relating the network traffic data from particular sources to particular destinations, etc. To illustrate, a network intelligence database may be maintained wherein certain sources (e.g., IP addresses) have been identified as being associated with particular types of anomalous traffic. The unknown clusters may then be labeled in accordance with the known identities and activities of these sources as derived from the network intelligence database. Alternatively, or in addition, a network technician or another person may manually inspect one or more of the clusters, the input vectors associated with the compressed vector representations grouped in one or more of the clusters, etc. to determine characteristics of the input vectors and/or the network traffic records (e.g., DNS traffic records) from which the input vectors may be derived, and to identify one or more possible anomaly types. In one example, the network traffic records, the input aggregate vectors, the clusters, and other data may all be maintained by a processing system and/or a database and made available to various users via respective user devices.

Figure 4:
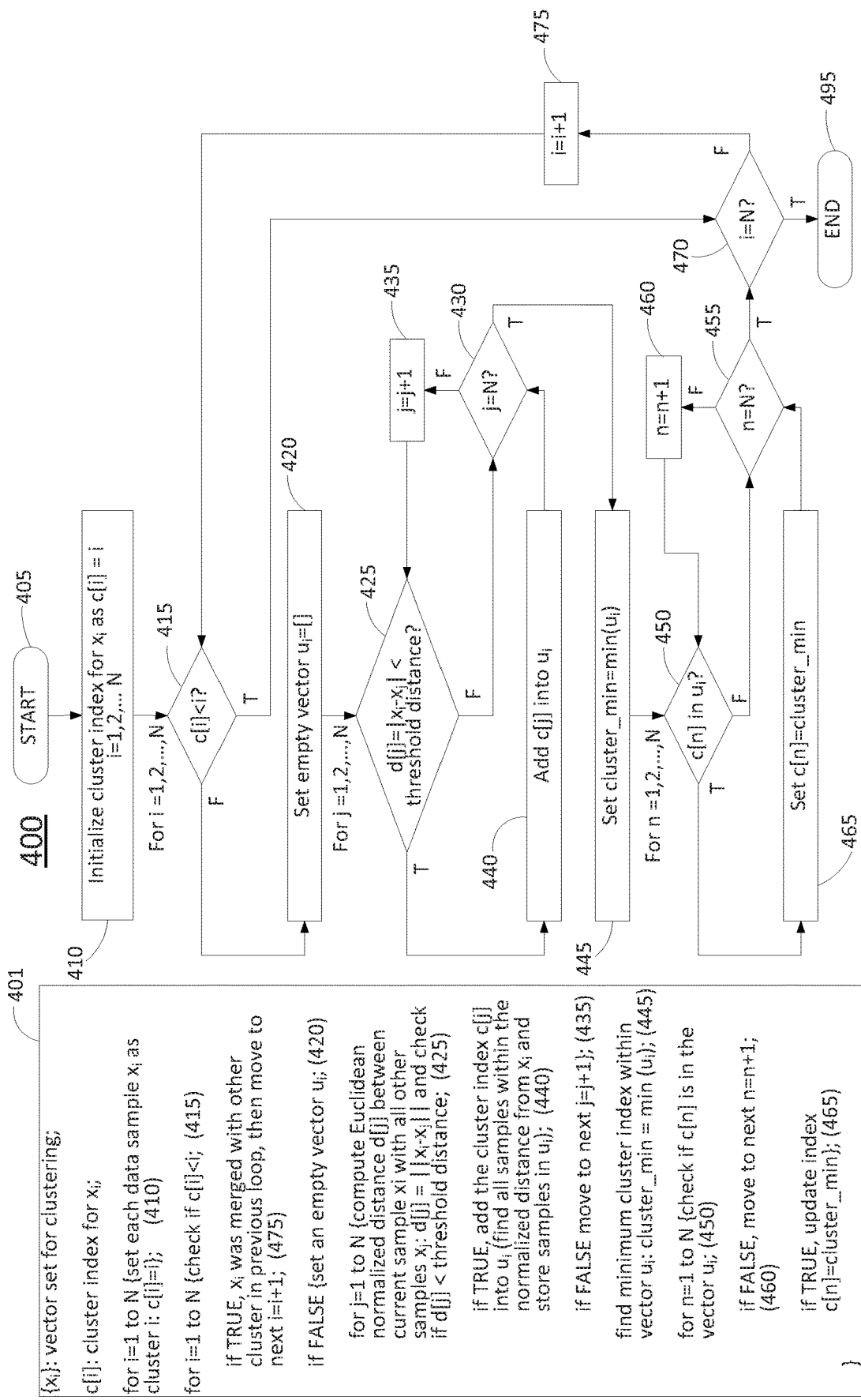
FIG. 4 illustrates an example process and outline for normalized distance-based clustering.

FIG. 4 illustrates a flowchart of an example process 400 for normalized distance-based clustering of the present disclosure, and a related outline 401. The outline 401 includes annotations indicating corresponding steps in the process 400 associated with respective portions of the outline 401. Thus, the outline 401 may be referenced in connection with the associated steps of the process 400 as discussed herein. The process 400 may relate to a vector set for clustering: $\{x_i\}$. For illustrative purposes, the vector set $\{x_i\}$ may comprise a plurality of compressed vector representations generated via an encoder-decoder neural network (e.g., an autoencoder) as described herein. However, in other examples, the vector set $\{x_i\}$ may comprise network traffic records, e.g., DNS traffic records or aggregate vectors derived from network traffic records. In one example, the process 400 may be performed by a processing system, such as processing system 104 of FIG. 1. The process 400 begins at step 405 and proceeds to step 410. At step 410, the processing system may initialize a cluster index for each sample in $x_i$ as $c[i]=i$; $i=1,2, \ldots N$. In other words, each sample is assigned a different cluster index, e.g., ranging from 1 to N. At step 415, the processing system may begin a main loop which repeats N times. At step 415, the processing system may determine of $c[i]$ is less than i. If this is true, it means that $c[i]$ has been merged with another cluster during a previous loop. The process may then proceed to step 470 to determine if the main loop is ended (e.g., $i=N$). If so, the process 400 may proceed to step 495 where the process 400 ends. Otherwise, the process 400 may proceed to step 475 to increment the loop counter $i=i+1$ and return to step 415.

On the other hand, if $c[i]$ is not less than i, it means that $c[i]$ has not been merged with another cluster. The process 400 may therefore proceed to step 420. At step 420, the processing system initializes an empty vector $u_i=[ \ ]$. The process may then proceed to step 425 and begin an inner loop which repeats N times. At step 425 the processing system may calculate a distance between the sample $x_i$ and each additional sample $x_j$; $j=1,2, \ldots N$. In addition, at step 425, the processing system may determine whether the distance is less than a threshold distance. For instance, the threshold distance may be based upon an aggregate normalized distance of the feature space and the number of samples in $\{x_i\}$, e.g., 1.5 times the normalized distance, 2 times the normalized distance, 8 times the normalized distance, etc.

When the distance is greater than or equal to the threshold distance, the process 400 may proceed to step 430 to determine if there are additional samples $x_j$ to be processed via the loop beginning at step 425 (e.g., $j \neq N$). If there are additional samples $x_j$ to be processed, the process 400 may proceed to step 435 to increment the loop counter $j=j+1$, and return to step 425. Otherwise, if there are no additional samples $x_j$ to be processed, (e.g., $j=N$), the process 400 may proceed to step 445.

However, if at any iteration of step 425 the distance $d[j]$ is less than the threshold, the sample, $x_j$ should be merged (clustered) with the sample $x_i$. This is tracked by adding the cluster index $c[j]$ into $u_i$ at step 440. Following step 440, the process 400 proceeds to step 430. The process 400 also proceeds to step 430 following step 425 when the distance exceeds the threshold. At step 430, the processing system determines if there are no additional samples $x_j$ to process (e.g., $j=N$). If there are no further samples, the process 400 proceeds to step 445. Otherwise, the process 400 may proceed to step 435 to increment the loop counter $j=j+1$, and return to step 425 to process additional samples $x_j$.

At step 445, the processing system determines the minimum cluster index, cluster_min, that is present in $u_i$. At step 450, the processing system then traverses all cluster indexes $c[n]$; $n=1,2, \ldots ,N$. If the cluster index $c[n]$ is in $u_i$, the cluster index $c[n]$ is updated to cluster_min, the minimum cluster index present in $u_i$. The loop of steps 450, 455, and 460 may continue until $n=N$. Notably, all of the samples in $\{x_i\}$ having cluster indexes set to the same cluster_min are now associated with the same cluster by virtue of having the same cluster index.

The process 400 may then proceed to step 470 to determine if there are additional samples for cluster indexes $c[i]$ to be processed according to the main loop beginning at step 415. When there are no additional samples of $c[i]$ to be processed via the main loop, the process 400 may proceed from step 470 to step 495 where the process 400 ends. It should be noted that following the process 400, various samples in $\{x_i\}$ may have the same cluster indexes. Any samples having a same cluster index are thus identified as being part of the same cluster.

Figure 5:
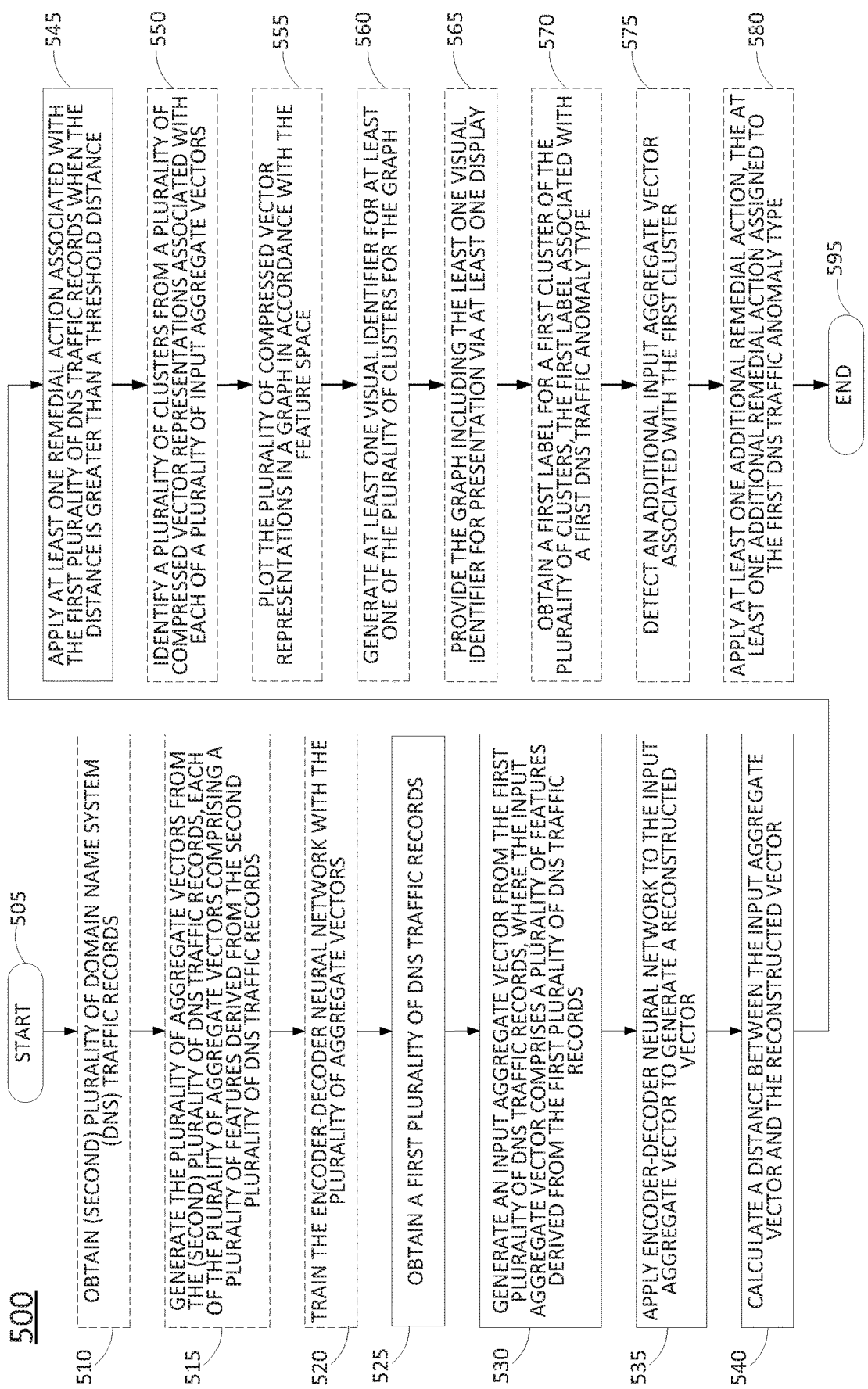
FIG. 5 illustrates a flowchart of an example method for detecting anomalous domain name system traffic records via an encoder-decoder neural network.

FIG. 5 illustrates a flowchart of an example method 500 for detecting anomalous domain name system traffic records via an encoder-decoder neural network, in accordance with the present disclosure. In one example, the method 500 is performed by a component of the system 100 of FIG. 1, such as by processing system 104, and/or any one or more components thereof (e.g., a processor, or processors, performing operations stored in and loaded from a memory), or by processing system 104, in conjunction with one or more other devices, such as DB 106, DNS resolvers 181-183, DNS authoritative servers 191-193, and so forth. In one example, the steps, functions, or operations of the method 500 may be performed by a computing device or system 700, and/or processor 702 as described in connection with FIG. 7 below. For instance, the computing device or system 700 may represent any one or more components of a server and/or processing system 104 in FIG. 1 that is/are configured to perform the steps, functions and/or operations of the method 500. Similarly, in one example, the steps, functions, or operations of method 500 may be performed by a processing system comprising one or more computing devices collectively configured to perform various steps, functions, and/or operations of the method 500. For instance, multiple instances of the computing device or processing system 700 may collectively function as a processing system. For illustrative purposes, the method 500 is described in greater detail below in connection with an example performed by a processing system. The method 500 begins in step 505 and may proceed to optional step 510 or to step 525.

At optional step 510, the processing system may obtain a plurality of DNS traffic records (e.g., a "second" plurality of DNS traffic records). For instance, the DNS traffic records may relate to DNS queries and replies between a client and a DNS resolver, between DNS resolvers of different layers, between a DNS resolver and a DNS authoritative server, and so forth.

At optional step 515, the processing system may generate a plurality of aggregate vectors from the plurality of DNS traffic records. For instance, each of the plurality of aggregate vectors may comprise a plurality of features derived from the second plurality of DNS traffic records.

At optional step 520, the processing system may train an encoder-decoder neural network (e.g., an autoencoder) with the plurality of aggregate vectors. In one example, the training comprises, for each of the plurality of aggregate vectors, a feedforward pass and a backpropagation of a deviation measure. For instance, the deviation measure may comprise a distance calculation between one of the aggregate vectors and a respective reconstructed vector generated via the encoder-decoder neural network.

At step 525, the processing system obtains a plurality of DNS traffic records (e.g., a "first" plurality of DNS traffic records). The first plurality of DNS traffic records may be of the same or a similar nature as the second plurality of DNS traffic records obtained at optional step 510.

At step 530, the processing system generates an input aggregate vector from the first plurality of DNS traffic records. For instance, the input aggregate vector may include a plurality of features derived from the first plurality of DNS traffic records. The plurality of features derived from the first plurality of DNS traffic records at step 530 and the plurality of features derived from the second plurality of DNS traffic records at optional step 515 may comprise a same set of feature types. For instance, an example set of feature types is illustrated in feature key 205 of FIG. 2. In one example, the first plurality of DNS traffic records and the second plurality of DNS traffic records are associated with DNS queries from at least one DNS resolver to at least one DNS authoritative server. In addition, in such an example, each of the input aggregate vector (derived from the first plurality of DNS traffic records) and the plurality of aggregate vectors (derived from the second plurality of DNS traffic records) may comprise aggregate information associated with DNS traffic for one of the plurality of DNS resolvers over a designated time period, e.g., one minute time intervals. The plurality of aggregate vectors may alternatively or additionally relate to DNS queries between at least one client device and at least one DNS resolver. In one example, the aggregate information comprises, for the one of the plurality of DNS resolvers and for the designated time period, at least one of: a number of queries received, a number of queries sent, a number of DNS authoritative servers contacted, an average time-to-live value for the queries received, an average domain name length in the queries received, a number of unique top level domains included in the queries received, a number of unique second level domains included in the queries received, and so forth.

The aggregate information may alternatively or additionally comprise, for the one of the plurality of DNS resolvers and for the designated time period, a total number of DNS resolvers contacting a DNS authoritative server that is most contacted by the one of the plurality of DNS resolvers, or a total number of queries received by the DNS authoritative server that is most contacted by the one of the plurality of DNS resolvers. For instance, this information may be useful to indicate an attack on a DNS authoritative server by one or more "bad" DNS resolvers, or by a botnet or the like targeting a DNS authoritative server through one or more DNS resolvers.

At step 535, the processing system applies an encoder-decoder neural network to the input aggregate vector to generate a reconstructed vector. In one example, the encoder-decoder neural network is trained with a plurality of aggregate vectors generated from the second plurality of DNS traffic records (e.g., according to optional steps 510-520 above). The encoder-decoder neural network (e.g., an autoencoder) may operate to encode the input aggregate vector as a compressed vector representation and to decode the compressed vector representation as the reconstructed vector. In one example, the encoder-decoder neural network comprises between five and nine layers. In one example, the compressed vector representation comprises between two and four features.

At step 540, the processing system calculates a distance between the input aggregate vector and the reconstructed vector. For instance, the distance may represent a reconstruction error comprising the difference (e.g., a Euclidean distance) between the input aggregate vector and the reconstructed vector that is output from the encoder-decoder neural network.

At step 545, the processing system applies at least one remedial action associated with the first plurality of DNS traffic records when the distance is greater than a threshold distance. For instance, when the distance is greater than the threshold distance, the first plurality of DNS traffic records is categorized as anomalous DNS traffic records. In one example, the at least one remedial action associated with the first plurality of DNS records is associated with at least one source of at least one of the first plurality of DNS traffic records. For instance, the at least one remedial action may comprise forwarding a DNS query from a source associated with the first plurality of DNS traffic records to a DNS authoritative server that is designated to process DNS queries associated with the anomalous DNS traffic records. For instance, in one example, the DNS authoritative server can process the query purposefully in a slow manner. Alternatively, or in addition, the at least one remedial action may comprise dropping a DNS query from a source associated with the first plurality of DNS traffic records. Other remedial actions may include sandboxing, providing a response with a different IP address that the IP address that would normally be returned for the query, e.g., redirecting back to the client requestor, redirecting to warning page maintained by DNS provider, etc. In one example, a "source" can be a client sending one or more DNS queries to one or more DNS resolvers, or could be a DNS resolver forwarding queries to one or more DNS authoritative servers.

At optional step 550, the processing system may identify a plurality of clusters from a plurality of compressed vector representations associated with each of a plurality of input aggregate vectors (e.g., where the plurality of input aggregate vectors includes the input aggregate vector). For instance, the plurality of clusters may be identified in a feature space having a plurality of dimensions in accordance with the plurality of compressed vector representations. For example, the plurality of clusters may be identified in accordance with a normalized distance-based unsupervised clustering algorithm, such as described in connection with the example process 400 of FIG. 4, the example method 600 of FIG. 6, and/or as otherwise described herein.

At optional step 555, the processing system may plot the plurality of compressed vector representations in a graph in accordance with the feature space. For instance, the graph may be in a similar format as described in connection with the graph 320 of FIG. 3, e.g., with each respective axis representing one of the plurality of dimensions/features of the compressed vector representations.

At optional step 560, the processing system may generate at least one visual identifier for at least one of the plurality of clusters for the graph. For instance, the visual identifier may comprise a highlighting, a circle, or the like to identify the boundaries of the at least one of the plurality of clusters.

At optional step 565, the processing system may provide the graph including the least one visual identifier for presentation via at least one display. For instance, the processing system may provide the graph to user devices of one or more network technicians or other parties.

At optional step 570, the processing system may obtain a first label for a first cluster of the plurality of clusters, the first label associated with a first DNS traffic anomaly type. In one example, the first label may be provided by a network technician or another person inspecting the graph provided at optional step 565, inspecting the DNS traffic records, and/or inspecting the input aggregate vectors. In another example, the first label may be obtained automatically. For example, the largest cluster may be automatically labeled as being associated with "normal" network traffic data. One or more other clusters may then be identified as representing anomalous DNS traffic records. In one example, compressed vector representations that are the samples for clustering may be known to relate to DNS traffic from particular sources to particular destinations, etc., where certain sources (e.g., IP addresses) have been identified as being associated with particular types of anomalous traffic, such as known botnet command and control servers, known sources of scan and probe attacks, known DNS authoritative server DDoS attack sources, and so forth.

At optional step 575, the processing system may detect an additional input aggregate vector associated with the first cluster. In one example, "associated with first cluster" may mean having distance between the additional input aggregate vector and the respective reconstructed vector being greater than the threshold distance and also being grouped in the first cluster based upon the compressed vector representation of the additional input aggregate vector as generated via the encoder-decoder neural network.

At optional step 580, the processing system may apply at least one additional remedial action, wherein the at least one additional remedial action is assigned to the first DNS traffic anomaly type. The at least one additional remedial action may involve blocking DNS traffic from one or more clients associated with the additional DNS traffic records from which the additional input aggregate vector is derived, directing queries from DNS resolver(s) associated with the additional DNS traffic records from which the additional input aggregate vector is derived to a different DNS authoritative server, blocking, dropping, or redirecting additional types of traffic from the client(s) and/or DNS resolver(s) associated with the additional DNS traffic records from which the additional input aggregate vector is derived, and so forth.

Following step 545 or any one of optional steps 555-580, the method 500 may proceed to step 595 where the method ends.

It should be noted that the method 500 may be expanded to include additional steps, or may be modified to replace steps with different steps, to combine steps, to omit steps, to perform steps in a different order, and so forth. For instance, in one example the processing system may repeat one or more steps of the method 500 for additional DNS traffic records, e.g., to identify anomalous DNS traffic records and apply associated remedial action(s), to clear DNS traffic records as being "normal", and so on. In another example, the method 500 may be expanded to include updating the encoder-decoder neural network, e.g., retraining the encoder-decoder neural network with the input aggregate vector and/or additional aggregate vectors derived from additional DNS traffic records. In one example, the method 500 may further include labeling the clusters in the graph of optional step 555 when labels are obtained, e.g., at optional step 570. In addition, the method 500 may further include labeling a cluster of compressed vector representations associated with "normal" traffic in addition to labeling cluster(s) of compressed vector representations associated with anomalous, e.g., "bad" traffic. Thus, these and other modifications are all contemplated within the scope of the present disclosure.

Figure 6:
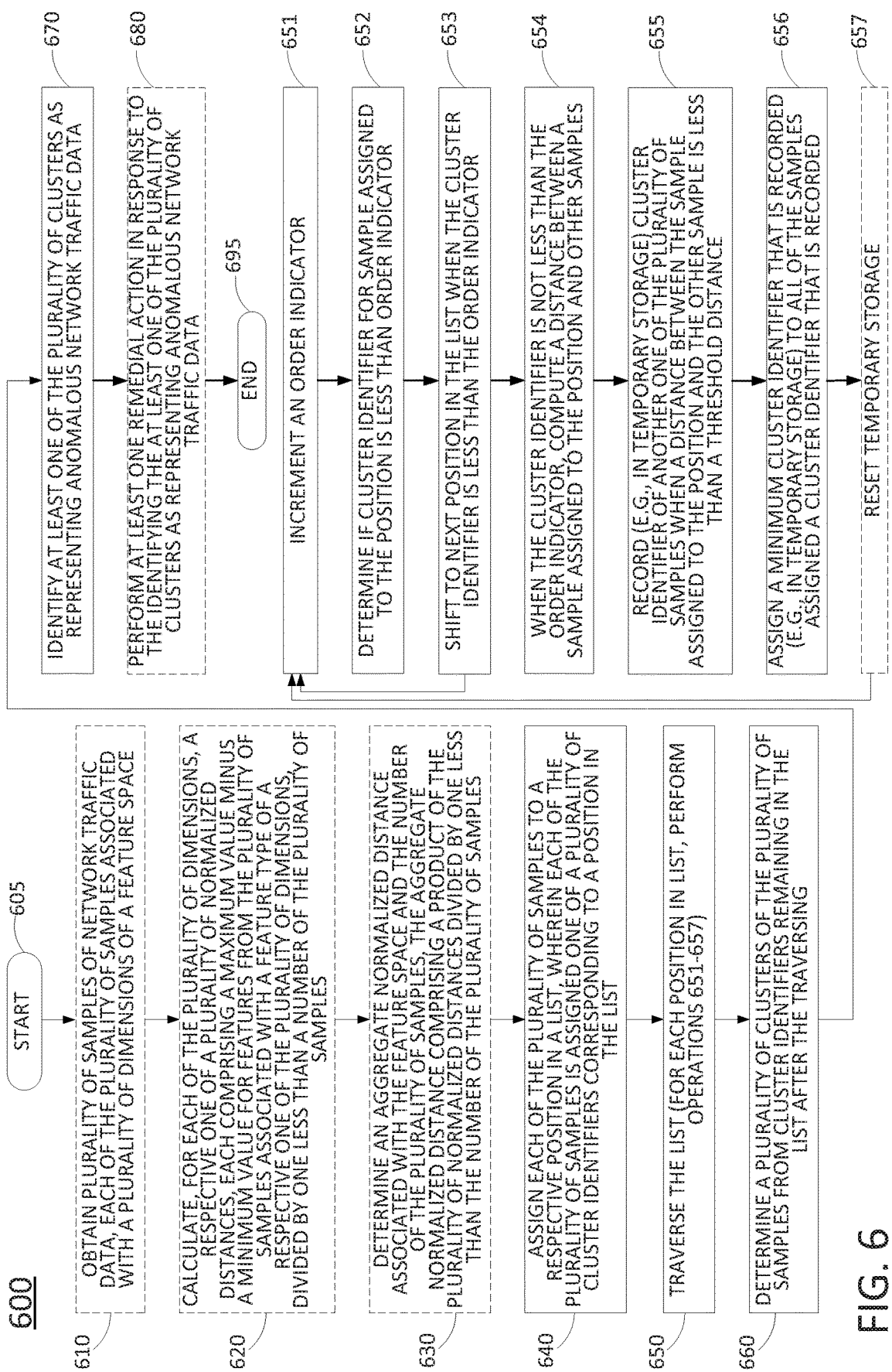
FIG. 6 illustrates a flowchart of an example method for identifying anomalous network traffic data via normalized distance-based clustering.

FIG. 6 illustrates a flowchart of an example method 600 for identifying anomalous network traffic data via normalized distance-based clustering, in accordance with the present disclosure. In one example, the method 600 is performed by a component of the system 100 of FIG. 1, such as by processing system 104, and/or any one or more components thereof (e.g., a processor, or processors, performing operations stored in and loaded from a memory), or by processing system 104, in conjunction with one or more other devices, such as DB 106, DNS resolvers 181-183, DNS authoritative servers 191-193, and so forth. In one example, the steps, functions, or operations of the method 600 may be performed by a computing device or system 700, and/or processor 702 as described in connection with FIG. 7 below. For instance, the computing device or system 700 may represent any one or more components of a server and/or processing system 104 in FIG. 1 that is/are configured to perform the steps, functions and/or operations of the method 600. Similarly, in one example, the steps, functions, or operations of method 600 may be performed by a processing system comprising one or more computing devices collectively configured to perform various steps, functions, and/or operations of the method 600. For instance, multiple instances of the computing device or processing system 700 may collectively function as a processing system. For illustrative purposes, the method 600 is described in greater detail below in connection with an example performed by a processing system. The method 600 begins in step 605 and may proceed to optional step 610 or to step 640.

At optional step 610, the processing system may obtain a plurality of samples of network traffic data, each of the plurality of samples associated with a plurality of dimensions of a feature space. In one example, the number of the plurality of dimensions (and hence the number of features) may be between two and seven. In one example, the samples of the network traffic data are derived from a plurality of DNS traffic records. In one example, the samples of the network traffic data may comprise compressed vector representations of input aggregate vectors generated via an encoder-decoder neural network, where each input aggregate vector may comprise a plurality of features derived from the plurality of DNS traffic records. For instance, each input aggregate vector may comprise aggregate information associated with DNS traffic for one of a plurality DNS resolvers over a designated time period.

The encoder-decoder neural network (e.g., an autoencoder) may encode the input aggregate vectors as compressed vector representations and decode the compressed vector representations as reconstructed vectors. In one example, the encoder-decoder neural network may be trained with a plurality of aggregate vectors generated from a second plurality of DNS traffic records. In one example, the compressed vector representations may comprise between two and four features. In addition, in such an example, the number of the plurality of dimensions of the features space may be the same as the number of features of the compressed vector representations.

At optional step 620, the processing system may calculate, for each of the plurality of dimensions, a respective one of a plurality of normalized distances, wherein each of the plurality of normalized distances comprises a difference between a maximum value and a minimum value for features from the plurality of samples associated with a feature type of a respective one of the plurality of dimensions, divided by one less than a number of the plurality of samples.

At optional step 630, the processing system may determine an aggregate normalized distance associated with the feature space and the number of the plurality of samples. For example, the aggregate normalized distance may comprise a product of the plurality of normalized distances for the different dimensions, divided by one less than the number of the plurality of samples.

At step 640, the processing system assigns each of the plurality of samples of network traffic data to a respective position in a list, wherein each of the plurality of samples is initially assigned one of a plurality of cluster identifiers corresponding to the respective position in the list.

At step 650, the processing system traverses the list. As illustrated in FIG. 5, step 650 may include a plurality of sub-steps, e.g., steps 651-657. The traversing of the list may therefore include performing steps 651-657 for each position in the list.

At step 651, the processing system increments an order indicator, where the order indicator broadly indicates a relative order between different elements, e.g., positions in the list, cluster identifier values, alphanumeric characters, and so on. For example, the order indicator may comprise a numeric index counter, e.g., an integer value starting at zero or another base number. In another example, the order indicator may be an alphabetical string, an alphanumeric string, etc. In one example, the plurality of cluster identifiers that is initially assigned at step 640 may comprise one of N such order indicators corresponding to the relative positions in the list (e.g., 1 to N, if the order indicator is a numeric index counter).

At step 652, the processing system determines if a cluster identifier for a sample assigned to the position in the list indicated by the order indicator is less than the order indicator.

At step 653, the processing system shifts to a next position in the list when the cluster identifier for the sample assigned to the position is less than the order indicator. In other words, the processing system may return to step 651 when there are additional positions in the list to process. Otherwise, the processing system may proceed to step 654 when the cluster identifier is not less than the order indicator.

At step 654, the processing system computes a distance between a sample assigned to the position and other samples in the plurality of samples (e.g., each of the other samples).

At step 655, when a distance between the sample assigned to the position and another one of the plurality of samples is less than a threshold distance, the processing records a cluster identifier of the another one of the plurality of samples. For instance, the cluster identifier may be recorded to a temporary storage, e.g., a volatile or non-volatile memory, virtual memory (e.g., on disk), and so on. The recording may be in a temporary vector, a linked list, or any such data structure. The threshold distance may be based upon the aggregate normalized distance associated with the feature space and a number of the plurality of samples. For instance, the threshold distance may comprise a multiple of the aggregate normalized distance, e.g., between 1.5 and 8 times the aggregate normalized distance. In one example, the threshold distance is between three and five times the aggregate normalized distance.

At step 656, the processing system assigns a minimum cluster identifier of the cluster identifiers that are recorded (e.g., in temporary storage) to all of the samples assigned a cluster identifier that is recorded (e.g., in the temporary storage). For example, if the cluster identifiers of values 2, 4, and 5 are recorded at step 655, then the minimum cluster identifier value of 2 will be selected to replace the other two cluster identifiers having the values of 4 and 5.

At optional step 657, the processing system may reset the temporary storage for the next iteration if the same temporary storage is used again for the recordation. Following step 656 or optional step 657, the processing system may return to step 651 when there are additional positions in the list to process. Otherwise, the processing system may continue to step 660.

At step 660, the processing system determines a plurality of clusters of the plurality of samples from cluster identifiers remaining in the list after the traversing. For example, various samples in the list may have the same cluster indexes. Any samples having a same cluster identifier (or "cluster index") are thus identified as being part of the same cluster.

At step 670, the processing system identifies at least one of the plurality of clusters as representing anomalous network traffic data. For example, the at least one of the plurality of clusters may represent anomalous network traffic data when it is not the largest cluster (e.g., the largest cluster is "normal," any other cluster is associated with anomalous network traffic data).

At optional step 680, the processing system may perform at least one remedial action in response to the identifying the at least one of the plurality of clusters as representing anomalous network traffic data. In one example, the at least one remedial action may include providing a graph comprising the plurality of clusters for presentation via at least one display. In one example, the processing system may also generate at least one visual identifier for at least one of the plurality of clusters for the graph, and provide the at least one visual identifier in the graph. For instance, the graph may comprise a plurality of dimensions of the feature space with each point plotted in the graph representing the features of one of the samples of network traffic data. In one example, the feature space comprises two dimensions or three dimensions. In one example, for a larger feature space, the processing system may apply a principal component analysis (PCA) to reduce to two or three dimensions for visualization in the graph.

In one example, optional step 680 may alternatively or additionally include obtaining a first label for a first one of the at least one of the plurality of clusters, where the first label is associated with a first network traffic anomaly type, and detecting an additional sample of network traffic data associated with the first one of the at least one of the plurality of clusters. The additional sample of network traffic data may be associated with the first one of the at least one of the plurality of clusters by determining that a distance between the additional sample of network traffic data and the first one of the at least one of the plurality of clusters is less than the threshold distance. For instance, the distance may be measured between the additional sample and a center of the cluster, and/or between the additional sample and a closest one of the other samples in the cluster. The additional sample of network traffic data and the plurality of samples of network traffic data may be derived from DNS traffic records, and the first network traffic anomaly type may be associated with anomalous DNS traffic. In addition, in such an example, optional step 680 may further include performing at least one of: forwarding a DNS query from a source associated with the additional sample of network traffic data to a DNS authoritative server that is designated to process suspect DNS queries or dropping the DNS query, e.g., at the DNS authoritative server and/or or at one or more DNS resolvers. Following step 670 or optional step 680, the method 600 may proceed to step 695 where the method ends.

It should be noted that the method 600 may be expanded to include additional steps, or may be modified to replace steps with different steps, to combine steps, to omit steps, to perform steps in a different order, and so forth. For instance, in one example the processing system may repeat one or more steps of the method 600 for additional network traffic records. In another example, the method may utilize a different calculation for the normalized distances for the respective dimensions and/or for the aggregate normalized distance. For instance, the normalized distance for a dimension may be calculated as a difference between a maximum value and a minimum value for features from the plurality of samples associated with a feature type of a respective one of the plurality of dimensions, divided by the actual number of the plurality of samples, divided by two less than the number of the plurality of samples, divided by two more than the number of the plurality of samples, etc. Similarly, the aggregate normalized distance may be calculated as a product of the plurality of normalized distances divided by the actual number of the plurality of samples, divided by two less than the number of the plurality of samples, divided by two more than the number of the plurality of samples, etc. In another example, the method 600 may further include labeling a cluster associated with "normal" network traffic data in addition to labeling cluster(s) of anomalous network traffic. In still another example, the threshold applied at optional step 680 may be different from the threshold that is used for initial clustering, e.g., 2.5 times the aggregate normalized distance versus 2.7 times the aggregate normalized distance, etc. Thus, these and other modifications are all contemplated within the scope of the present disclosure.

In addition, although not expressly specified above, one or more steps of the method 400, method 500 and/or the method 600 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4, FIG. 5 or FIG. 6 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 7 depicts a high-level block diagram of a computing device or processing system specifically programmed to perform the functions described herein. For example, any one or more components or devices illustrated in FIG. 1, or described in connection with the methods 400, 500 and 600 may be implemented as the processing system 700. As depicted in FIG. 7, the processing system 700 comprises one or more hardware processor elements 702 (e.g., a microprocessor, a central processing unit (CPU) and the like), a memory 704, (e.g., random access memory (RAM), read only memory (ROM), a disk drive, an optical drive, a magnetic drive, and/or a Universal Serial Bus (USB) drive), a module 705 for detecting anomalous domain name system traffic records via an encoder-decoder neural network and/or for identifying anomalous network traffic data via normalized distance-based clustering, and various input/output devices 706, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 702 can also be configured or programmed to cause other devices to perform one or more operations as discussed above. In other words, the hardware processor 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 705 for detecting anomalous domain name system traffic records via an encoder-decoder neural network and/or for identifying anomalous network traffic data via normalized distance-based clustering (e.g., a software program comprising computer-executable instructions) can be loaded into memory 704 and executed by hardware processor element 702 to implement the steps, functions or operations as discussed above in connection with the example method 400, method 500 and/or example method 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for detecting anomalous domain name system traffic records via an encoder-decoder neural network and/or for identifying anomalous network traffic data via normalized distance-based clustering (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
assigning, by a processing system including at least one processor, each of a plurality of samples of network traffic data to a respective position in a list, wherein each of the plurality of samples is assigned one of a plurality of cluster identifiers corresponding to the respective position in the list;
traversing, by the processing system, the list, wherein for each position in the list, the traversing comprises:
incrementing an order indicator;
determining if a cluster identifier of the plurality of cluster identifiers for a sample of the plurality of samples assigned to the position is less than the order indicator;
shifting to a next position in the list when the cluster identifier is less than the order indicator; or
when the cluster identifier is not less than the order indicator:
computing a distance between the sample assigned to the position and all other samples in the plurality of samples;
recording a cluster identifier of another one of the plurality of samples when a distance between the sample assigned to the respective position and the another one of the plurality of samples is less than a threshold distance, wherein the threshold distance is based upon an aggregate normalized distance associated with a feature space of the plurality of samples and a number of the plurality of samples; and
selecting a minimum cluster identifier among the cluster identifiers that are recorded, for assignment to all other cluster identifiers that are recorded;
determining, by the processing system, a plurality of clusters of the plurality of samples from cluster identifiers remaining in the list after the traversing; and
identifying, by the processing system, at least one of the plurality of clusters as representing anomalous network traffic data.

2. The method of claim 1, further comprising:
obtaining, by the processing system, the plurality of samples, each of the plurality of samples associated with a plurality of dimensions of the feature space;
calculating, by the processing system for each of the plurality of dimensions, a respective one of a plurality of normalized distances, wherein each of the plurality of normalized distances comprises a difference between a maximum value and a minimum value for features from the plurality of samples associated with a feature type of a respective one of the plurality of dimensions, divided by one less than the number of the plurality of samples; and
determining, by the processing system, the aggregate normalized distance associated with the feature space and the number of the plurality of samples, wherein the aggregate normalized distance comprises a product of the plurality of normalized distances divided by the one less than the number of the plurality of samples.

3. The method of claim 2, wherein a number of the plurality of dimensions is between two and seven.

4. The method of claim 2, wherein the threshold distance comprises a multiple of the aggregate normalized distance.

5. The method of claim 4, wherein the threshold distance is between 1.5 and 8 times the aggregate normalized distance.

6. The method of claim 1, wherein the plurality of samples of the network traffic data is derived from a first plurality of domain name system traffic records.

7. The method of claim 6, wherein the plurality of samples of the network traffic data comprises compressed vector representations of input aggregate vectors generated via an encoder-decoder neural network, wherein each input aggregate vector comprises a plurality of features derived from the first plurality of domain name system traffic records.

8. The method of claim 7, wherein the encoder-decoder neural network is to encode the input aggregate vectors as the compressed vector representations and to decode the compressed vector representations as reconstructed vectors.

9. The method of claim 7, wherein the compressed vector representations comprise between two and four features of the plurality of features.

10. The method of claim 7, wherein each input aggregate vector comprises aggregate information associated with domain name system traffic for one of a plurality of domain name system resolvers over a designated time period.

11. The method of claim 7, wherein the encoder-decoder neural network is trained with a plurality of aggregate vectors generated from a second plurality of domain name system traffic records.

12. The method of claim 1, further comprising:
performing at least one remedial action in response to the identifying the at least one of the plurality of clusters as representing the anomalous network traffic data.

13. The method of claim 12, wherein the performing the at least one remedial action comprises:
   providing a graph comprising the plurality of clusters for presentation via at least one display.

14. The method of claim 13, wherein the providing the graph further comprises:
   generating at least one visual identifier for at least one of the plurality of clusters for the graph; and
   providing the at least one visual identifier in the graph.

15. The method of claim 13, wherein the graph comprises a plurality of dimensions of the feature space.

16. The method of claim 15, wherein the feature space comprises:
   two dimensions of the plurality of dimensions; or
   three dimensions of the plurality of dimensions.

17. The method of claim 12, wherein the performing the at least one remedial action comprises:
   obtaining a first label for a first one of the at least one of the plurality of clusters, the first label associated with a first network traffic anomaly type;
   detecting an additional sample of the network traffic data associated with the first one of the at least one of the plurality of clusters, wherein the additional sample of the network traffic data and the plurality of samples of the network traffic data are derived from domain name service traffic records, wherein the first network traffic anomaly type comprises anomalous domain name system traffic; and
   performing at least one of:
      forwarding a domain name system query from a source associated with the additional sample of the network traffic data to a domain name system authoritative server that is designated to process the anomalous domain name system traffic; or
      dropping the domain name system query.

18. The method of claim 17, wherein the detecting the additional sample of the network traffic data associated with the first one of the at least one of the plurality of clusters comprises:
   determining that a distance between the additional sample of the network traffic data and the first one of the at least one of the plurality of clusters is less than the threshold distance.

19. A non-transitory computer-readable medium storing instructions which, when executed by a processing system including at least one processor, cause the processing system to perform operations, the operations comprising:
   assigning each of a plurality of samples of network traffic data to a respective position in a list, wherein each of the plurality of samples is assigned one of a plurality of cluster identifiers corresponding to the respective position in the list;
   traversing the list, wherein for each position in the list, the traversing comprises:
      incrementing an order indicator;
      determining if a cluster identifier of the plurality of cluster identifiers for a sample of the plurality of samples assigned to the position is less than the order indicator;
      shifting to a next position in the list when the cluster identifier is less than the order indicator; or
      when the cluster identifier is not less than the order indicator:
         computing a distance between the sample assigned to the position and all other samples in the plurality of samples;
         recording a cluster identifier of another one of the plurality of samples when a distance between the sample assigned to the respective position and the another one of the plurality of samples is less than a threshold distance, wherein the threshold distance is based upon an aggregate normalized distance associated with a feature space of the plurality of samples and a number of the plurality of samples; and
         selecting a minimum cluster identifier among the cluster identifiers that are recorded, for assignment to all other cluster identifiers that are recorded;
   determining a plurality of clusters of the plurality of samples from cluster identifiers remaining in the list after the traversing; and
   identifying at least one of the plurality of clusters as representing anomalous network traffic data.

20. A device comprising:
   a processing system including at least one processor; and
   a computer-readable medium storing instructions which, when executed by the processing system, cause the processing system to perform operations, the operations comprising:
      assigning each of a plurality of samples of network traffic data to a respective position in a list, wherein each of the plurality of samples is assigned one of a plurality of cluster identifiers corresponding to the respective position in the list;
      traversing the list, wherein for each position in the list, the traversing comprises:
         incrementing an order indicator;
         determining if a cluster identifier of the plurality of cluster identifiers for a sample of the plurality of samples assigned to the position is less than the order indicator;
         shifting to a next position in the list when the cluster identifier is less than the order indicator; or
         when the cluster identifier is not less than the order indicator:
            computing a distance between the sample assigned to the position and all other samples in the plurality of samples;
            recording a cluster identifier of another one of the plurality of samples when a distance between the sample assigned to the respective position and the another one of the plurality of samples is less than a threshold distance, wherein the threshold distance is based upon an aggregate normalized distance associated with a feature space of the plurality of samples and a number of the plurality of samples; and
            selecting a minimum cluster identifier among the cluster identifiers that are recorded, for assignment to all other cluster identifiers that are recorded;
      determining a plurality of clusters of the plurality of samples from cluster identifiers remaining in the list after the traversing; and
      identifying at least one of the plurality of clusters as representing anomalous network traffic data.

* * * * *